(12) United States Patent
Tateishi (10) Patent No.: US 8,192,521 B2
(45) Date of Patent: Jun. 5, 2012

(54) METHOD OF SUPPRESSING SLAG FOAMING IN CONTINUOUS MELTING FURNACE

(75) Inventor: Masataka Tateishi, Kobe (JP)

(73) Assignee: Kobe Steel, Ltd., Kobe-shi (JP)

(*) Notice: Subject to any disclaimer, the term of this patent is extended or adjusted under 35 U.S.C. 154(b) by 92 days.

(21) Appl. No.: 12/672,215

(22) PCT Filed: Jul. 15, 2008

(86) PCT No.: PCT/JP2008/062743
§ 371 (c)(1),
(2), (4) Date: Feb. 4, 2010

(87) PCT Pub. No.: WO2009/019958
PCT Pub. Date: Feb. 12, 2009

(65) Prior Publication Data
US 2011/0203415 A1 Aug. 25, 2011

(30) Foreign Application Priority Data
Aug. 6, 2007 (JP) .................................. 2007-204444

(51) Int. Cl.
*C04B 5/06* (2006.01)
*C22B 9/10* (2006.01)

(52) U.S. Cl. ............... 75/385; 75/387; 75/560; 75/561; 65/20

(58) Field of Classification Search ............... 75/387, 75/385, 560, 561; 65/20
See application file for complete search history.

(56) References Cited

U.S. PATENT DOCUMENTS

| | | | | |
|---|---|---|---|---|
| 3,681,052 A | * | 8/1972 | Kawaguchi | 75/385 |
| 5,078,785 A | * | 1/1992 | Ibaraki et al. | 75/386 |
| 6,171,364 B1 | * | 1/2001 | Sarma et al. | 75/382 |

FOREIGN PATENT DOCUMENTS

| | | | |
|---|---|---|---|
| JP | 1 195212 | | 8/1989 |
| JP | 02156008 A | * | 6/1990 |
| JP | 10176210 A | * | 6/1998 |
| JP | 11 199916 | | 7/1999 |

OTHER PUBLICATIONS

Iwasaki et al. JP 02-156008. Written English Translation. published Jun. 15, 1990.*

Okazaki, T. et al., "Development of Slopping Prediction Technique by Measuring Furnace Pressure", Journal of the Iron & Steel Institute of Japan, vol. 67, No. 4, p. 225 (Mar. 5, 1981) (with English translation).

* cited by examiner

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

A method of suppressing slag foaming that can grasp a state of slag foaming in the continuous melting furnace and accurately suppress the slag foaming so as to enable continuous production of molten metal in a stable state. This method includes charging of a suppressor into slag in the furnace, measuring a flow rate of a flue gas discharged from the continuous melting furnace during blowing of the slag over time, increasing a charging speed rate of the suppressor if the flue gas flow rate has an increasing tendency and decreasing the charging speed rate of the suppressor if the flue gas flow rate has a decreasing tendency.

10 Claims, 8 Drawing Sheets

PRIOR ART

METHOD OF SUPPRESSING SLAG FOAMING IN CONTINUOUS MELTING FURNACE

This application is the 35 U.S.C. §371 National Stage of PCT/JP08/062,743, filed Jul. 15, 2008, which is incorporated herein by reference. This continuation application claims benefit of the Jul. 15, 2008, filing date of PCT/JP08/062,743 under 35 U.S.C. §§120 and 363, and benefit of the Aug. 6, 2007, filing date of Japanese Application 2007-204444 under 35 U.S.C. §119.

TECHNICAL FIELD

The present invention relates to a method of suppressing slag foaming in a continuous smelting furnace for suppressing slag foaming generated in the continuous melting furnace continuously producing metal such as molten iron by melting solid reduced metal such as solid reduced iron.

BACKGROUND ART

Figure 9:
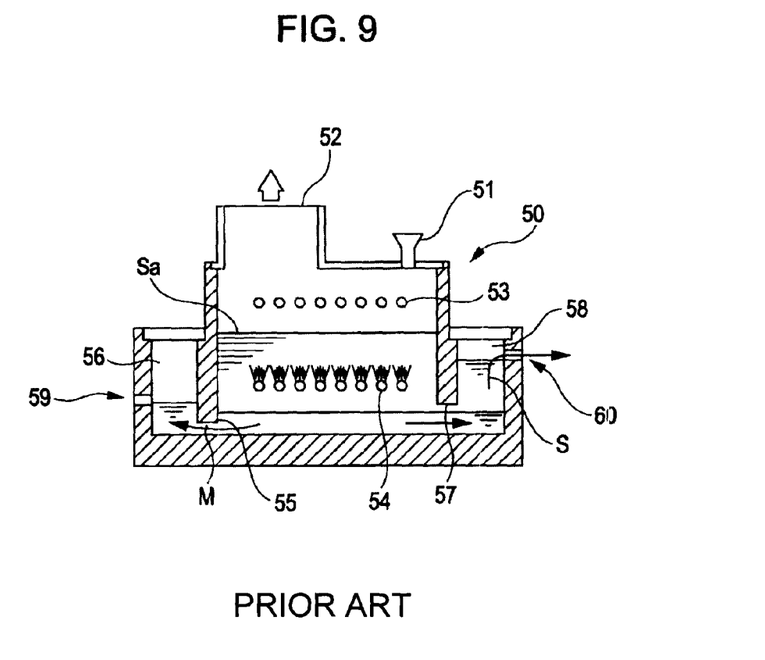
FIG. 9 is a longitudinal sectional view illustrating a configuration of a prior-art smelting reduction furnace.

FIG. 9 shows a configuration of a prior-art smelting reduction furnace.

The smelting reduction furnace is provided with a reaction vessel 50, and molten slag Sa is formed in this reaction vessel 50. In a roof section of the reaction vessel 50, a raw-material charging port 51 and a gas exhaust port 52 for exhausting a gas generated in the reaction vessel 50 are provided. This gas exhaust port 52 is connected to an exhaust gas treatment device or the like through a duct (See Patent Document 1, for example).

In an upper part of the reaction vessel 50, a plurality of upper tuyeres 53 for blowing oxygen are provided for secondary combustion of the gas generated in the furnace while in a lower part, lower tuyeres 54 for agitating the molten slag Sa by introducing oxygen (or oxygen-enriched air) are provided.

On the other hand, on both outsides of the lower part in the reaction vessel 50, a molten iron pool 56 communicating with the reaction vessel 50 through one siphon 55 and a slag pool 58 communicating with the reaction vessel 50 through the other siphon 57 are provided, respectively. In the molten iron pool 56, an iron outlet 59 for discharging molten iron M is provided, while in the slag pool 58, a slag outlet 60 for discharging slag S is provided.

In the smelting reduction furnace having the above configuration, iron materials, carbonaceous materials such as coal, coke and the like, and raw materials such as a slag forming material are continuously charged into the reaction vessel 50 through the raw-material charging port 51. As a result, the materials are melted and the molten slag Sa are produced in the reaction vessel 50. By blowing oxygen through the lower tuyeres 54 to this molten slag Sa, the molten slag Sa is agitated.

The materials having been charged into the molten slag Sa are mixed with the molten slag Sa so as to become molten slag, and iron oxide in the slag is reduced by charged coal.

CO gas and the like generated in the molten slag Sa reacts with the oxygen blown into a secondary combustion zone, and then is oxidized. The gas generated in the reaction vessel 50 is led to the outside of the furnace through the gas exhaust port 52 and discharged to the outside of the system through a flue gas treatment device.

In the lower part in the reaction vessel 50, molten iron (or pig iron) and the molten slag S are separated because of a difference in each specific gravity.

In the above-mentioned prior-art melting furnace, carbon in the molten iron/slag and oxygen react, and then a CO gas is generated, which causes air bubbles to be generated. Moreover, viscosity increases as content of iron oxide in the slag increases, and the generated CO gas tends to be contained and retained in the slag. As the number of air bubbles is increased in the slug, the slag becomes foamy, that is, so-called slag foaming tends to occur.

If excess slag foaming is left as it is, that causes trouble that high-temperature slag is ejected to the outside of the furnace through seal portions of a furnace top, a furnace cover and the like, and productivity is decreased. The slag foaming indicates unbalance of a reaction between oxidization and reduction in the furnace, which more or less gives a bad influence to a production process. Thus, in order to continuously produce molten metal stably, the slag foaming needs to be suppressed.

As means for suppression, a suppressor (the carbonaceous material, for example) for suppressing the slag foaming can be added to the slag, but appropriate addition is difficult due to several reasons. Specifically, in a process of continuously producing the molten metal, fluctuation in chemical components of the materials and amounts of charged/discharged materials cannot be controlled to zero. In addition, unexpected reactions occur in the furnace. Moreover, since temperature in the inside of the furnace is too high and amounts of generated molten dust and fume are large, it is practically impossible to monitor the inside of the furnace throughout the blowing time.

Patent Document 1: Japanese Unexamined Patent Application Publication No. 11-310814

DISCLOSURE OF INVENTION

The present invention was made in view of the above problems in the prior-art melting furnace and has an object to provide a method of suppressing slag foaming in a continuous melting furnace that can grasp a state of slag foaming in the melting furnace and accurately suppress the slag foaming so as to enable continuous produce of molten metal in a stable state.

The present invention is a method of suppressing slag foaming caused in a continuous melting furnace continuously producing molten metal such as molten iron by melting solid reduced metal and includes a first aspect in which a suppressor for suppressing slag foaming is charged to the slag generated in the continuous melting furnace and a charging speed rate is determined on the basis of a change in a flue gas flow rate as a mode for determining the charging speed rate, a second aspect in which the charging speed rate is determined on the basis of a change in CO concentration in the flue gas, and a third aspect in which the charging speed rate is determined on the basis of a change in the flue gas flow rate and the change in the CO concentration in the flue gas.

Specifically, the first aspect includes temporal measurement of a flow rate of the flue gas discharged from the continuous melting furnace during blowing and increase of the charging speed rate of the suppressor if the measured flue gas flow rate presents an increasing tendency and decrease of the charging speed rate of the suppressor if the flue gas flow rate presents a decreasing tendency.

The second aspect includes temporal measurement of CO concentration in the flue gas discharged from the continuous melting furnace during blowing and increase of the charging speed rate of the suppressor if the measured CO concentration exceeds a reference CO concentration set in advance and presents an increasing tendency and decrease of the charging speed rate of the suppressor if the CO concentration presents a decreasing tendency.

The third aspect includes temporal measurement of the flue gas flow rate discharge from the continuous melting furnace during blowing and CO concentration in the flue gas, examination of a tendency of the flue gas flow rate if the measured CO concentration is changed from the reference CO concentration set in advance, and increase of the charging speed rate of the suppressor for suppressing slag foaming if the flue gas flow rate presents an increasing tendency and decrease of the charging speed rate of the suppressor if the flue gas flow rate presents a decreasing tendency.

The continuous melting furnace in the present invention is a furnace connected to a rotary hearth furnace, for example, and continuously producing molten iron by melting solid reduced metal obtained by the rotary hearth furnace through combustion of a carbonaceous material supplied as a main material with oxygen.

The solid reduced metal or specifically, solid reduced iron is obtained in the rotary hearth furnace by heating and reducing a molded body containing iron oxide and a carbonaceous reducing agent. Energy to be supplied to the continuous melting furnace includes not only reaction energy by oxygen and carbon as mentioned above but may also be electric energy used in an electric furnace, for example.

Also, as the above-mentioned suppressor, aluminum, FeMn, FeNi, and SiMn, for example, are suitable in addition to the carbonaceous materials.

BEST MODE FOR CARRYING OUT THE INVENTION

The present invention will be described below in detail on the basis of embodiments shown in the attached drawings.

1. Configuration of the Melting Furnace

Figure 1:
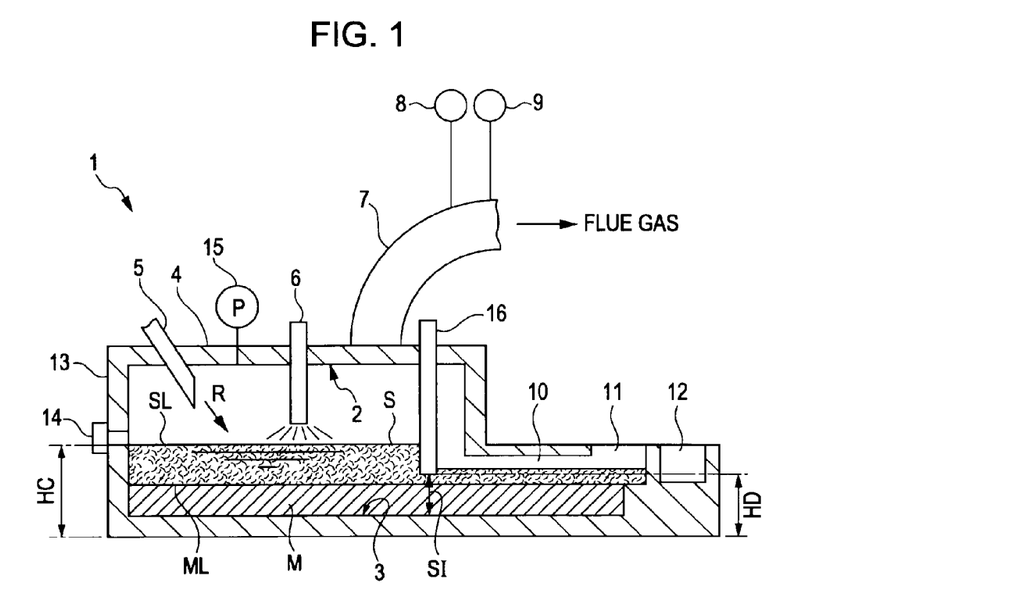
FIG. 1 is a front sectional view illustrating a configuration of a continuous melting furnace used for a method of suppressing slag foaming of the present invention.
Figure 2:
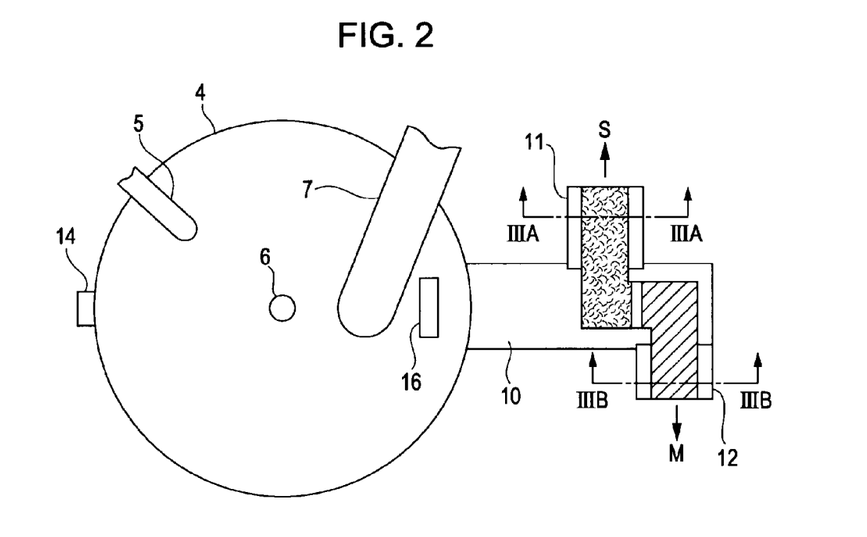
FIG. 2 is a plan view of FIG. 1.

FIG. 1 is a font sectional view illustrating a continuous melting furnace 1 to which a method of suppressing slag foaming of the present invention is applied, and FIG. 2 is a plan view thereof.

The continuous melting furnace 1 has a cylindrical melting furnace main body 4 having a roof section 2 and a bottom section 3, and in the roof section 2, a raw material charging port 5, an oxygen lance 6, and an exhaust gas duct 7 are disposed. Through the raw material charging port 5, raw fuel including solid reduced iron, carbonaceous material, slag forming material and the like is charged into the melting furnace main body 4. Through the oxygen lance 6, oxygen is blown into the melting furnace main body 4 from the oxygen lance 6. This oxygen burns at least one of the carbonaceous material in the slag and carbon in the molten iron as a heat source for melting the solid reduced iron. The exhaust gas duct 7 is to discharge a gas in the furnace after combustion.

In the exhaust gas duct 7, a CO content analyzer 8 for measuring CO gas concentration in the flue gas and an exhaust gas flow meter 9 for measuring a flow rate of the flue gas (specifically, having $N_2/CO/CO_2/O_2$ as main components) are disposed. A location where the exhaust gas flow meter 9 is provided is not limited to the exhaust gas duct 7 but may be provided in an exhaust gas pipeline for feeding the flue gas to a burning-type chimney after dust-removal and cooling. Alternatively, instead of the CO content analyzer 8, a $CO_2$ content analyzer for measuring $CO_2$ gas concentration in the flue gas or an $O_2$ content analyzer for measuring $O_2$ gas concentration may be provided.

Figure 3:
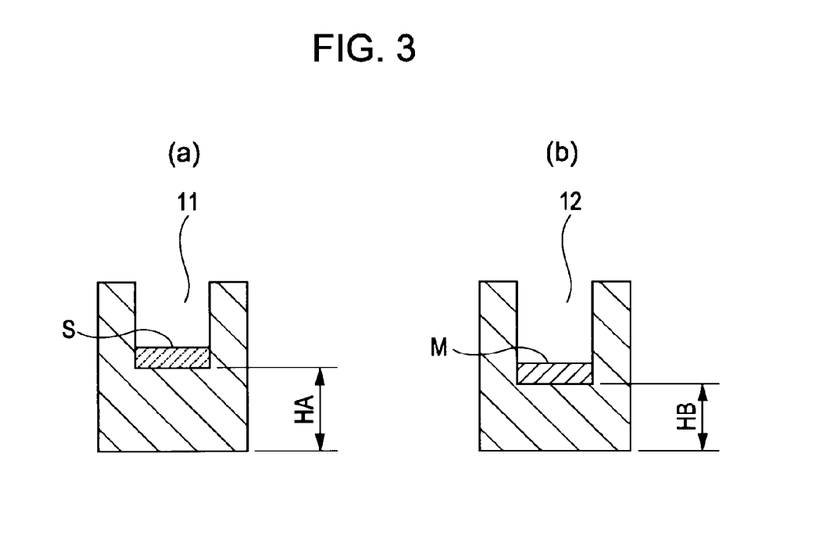
FIG. 3A is a longitudinal sectional view on IIIA-IIIA line in FIG. 2
FIG. 3B is a longitudinal sectional view on IIIB-IIIB line in FIG. 2.

From a lower part of the melting furnace main body 4, a molten metal pool portion 10 is extended, and a slag outlet 11 for continuously discharging the slag S and a molten iron outlet 12 for continuously discharging molten iron M are provided in this molten metal pool portion 10, respectively. The slag outlet 11 is provided on the upstream side from the molten iron outlet 12 so that the slag S is not mixed in the recovered molten iron M as much as possible, and a height HA of a passage bottom face of the slag outlet 11 is provided at a position higher than a height HB of a passage bottom face of the molten iron outlet 12 (See FIG. 3).

FIG. 3A is a longitudinal sectional view on IIIA-IIIA line in FIG. 2, and FIG. 3B is a longitudinal sectional view on IIIB-IIIB line in FIG. 2.

In FIG. 1, on a side wall 13 of the melting furnace main body 4, apart from the slag outlet 11, a second slag outlet 14 is provided capable of being opened/closed, and a height HC of the second slag outlet 14 is provided at a position higher than the height HA of the passage bottom face of the slag outlet 11 or in more detail, at a position higher than a height of a weir of a siphon SI.

In the melting furnace main body 4, a pressure meter 15 is provided for detecting a pressure change in the furnace when the second slag outlet 14 is opened/closed. The pressure meter 15 may be provided in the exhaust gas duct 7.

From the roof section 2 of the melting furnace main body 4, a partition plate 16 is suspended, and a gap constituting the siphon SI is formed between a lower end of the partition plate 16 and a bottom portion 3.

2. Operation of the Continuous Melting Furnace

Subsequently, an operation of the continuous melting furnace having the above configuration will be explained.

A raw material R charged through the raw material charging port 5 enters into a layer of the slag S and is molten by combustion heat of oxygen (or oxygen-enriched air) blown through the oxygen lance 6 and the carbonaceous material, the gas generated in the furnace and the like. The molten raw material is separated into the slag S and the molten iron M and moves into the slag layer and the molten iron layer, respectively, which raises a molten iron level ML and a slag level SL in the melting furnace main body 4, respectively. As a result, a liquid-pressure difference is generated between inside and outside of the melting furnace main body 4, increase portions of the slag S and the molten iron M passes through the siphon SI and moves to the molten metal pool portion 10, and the slag S is continuously discharged through the slag outlet 11 and the molten iron M through the molten iron outlet 12, respectively.

If generation speeds of the slag S and the molten iron M in the melting furnace main body 4 and discharge speeds from the molten metal pool portion 10 are well-balanced, the slag level SL is maintained constant as above, and the molten iron M can be continuously produced, but if the balance between the oxidation and reduction in the furnace is lost during blowing, slag foaming occurs. If this slag foaming is left as it is, high-temperature slag is ejected to the outside of the furnace through a seal portion of a furnace top, a furnace cover and the like, and productivity might be inhibited.

3. Method of Suppressing Slag Foaming

Thus, in the method of suppressing slag foaming of the present invention, a suppressor for suppressing the slag foaming is charged as appropriate into the slag S through the raw material charging port 5, and at least one of flue gas concentration and a flue gas flow rate is detected, and the charging speed rate of the suppressor is determined on the basis of a detection result.

Figure 4:
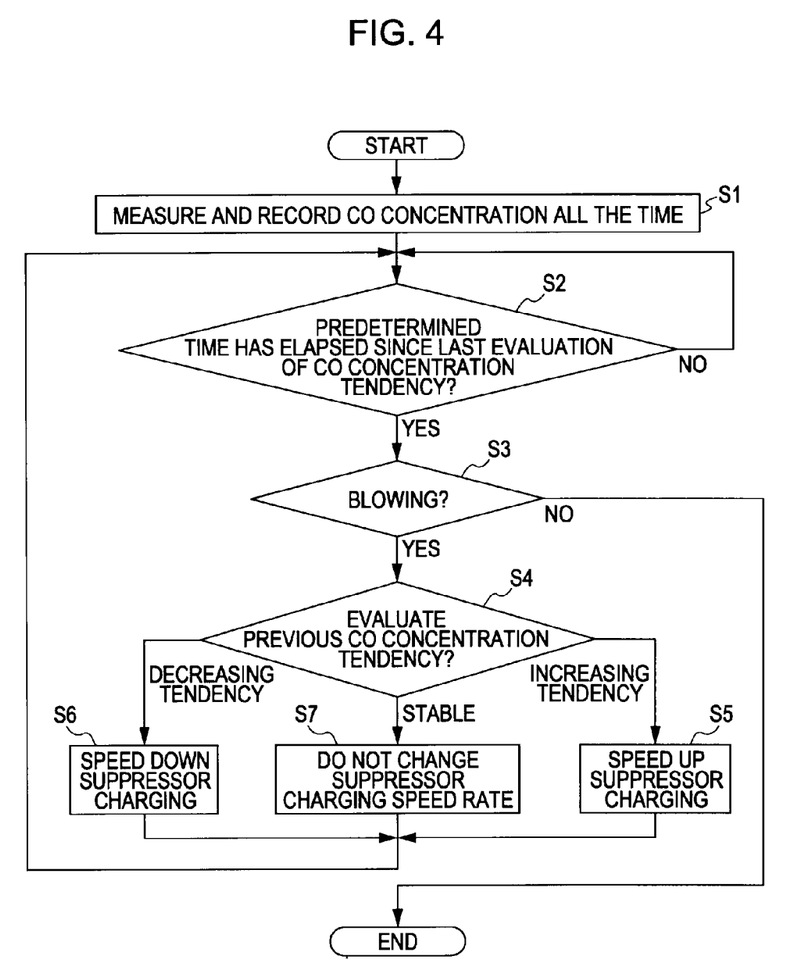
FIG. 4 is a flowchart for explaining a method of suppressing slag foaming according to a first embodiment of the present invention.
Figure 6:
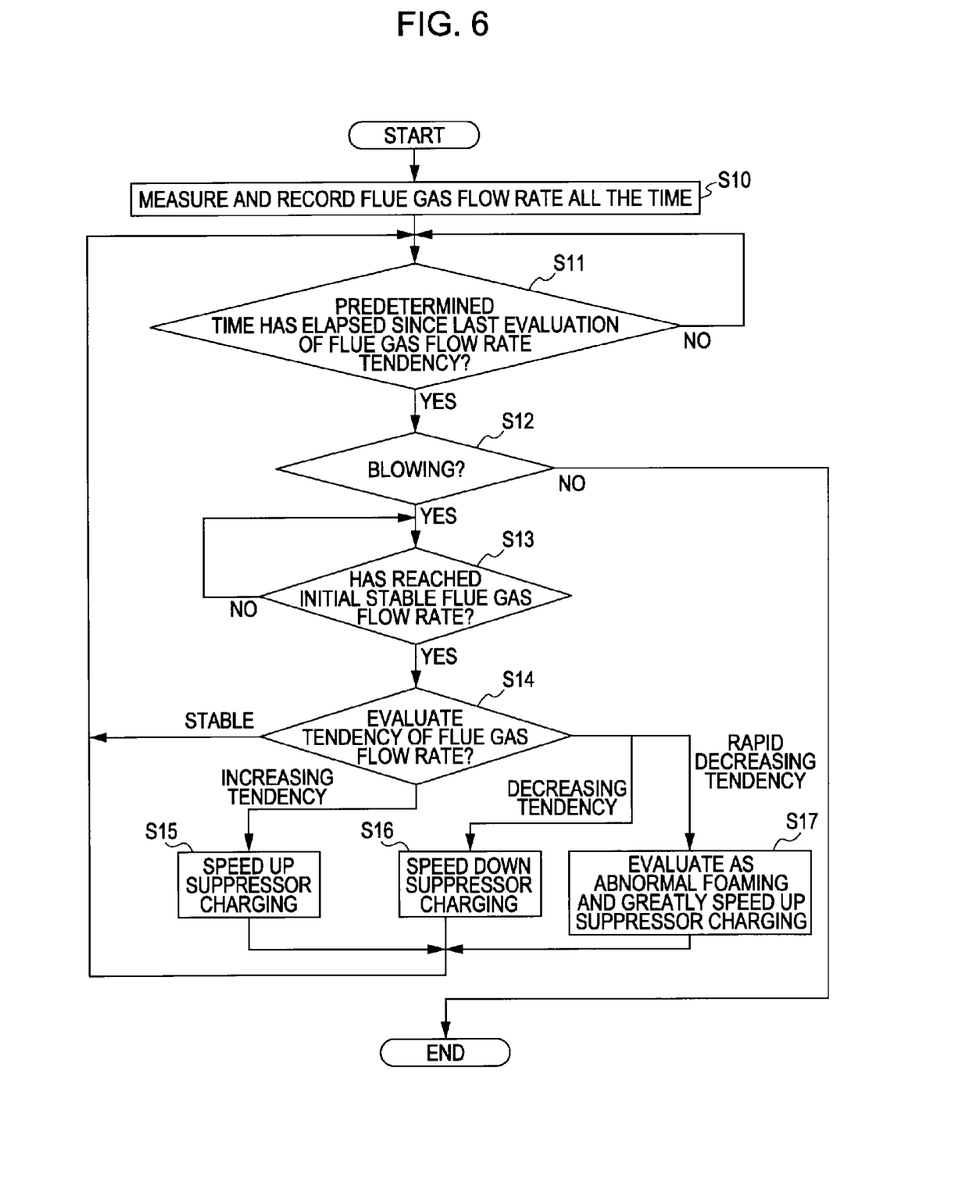
FIG. 6 is a flowchart for explaining a method for suppressing slag foaming according to a second embodiment of the present invention.
Figure 8:
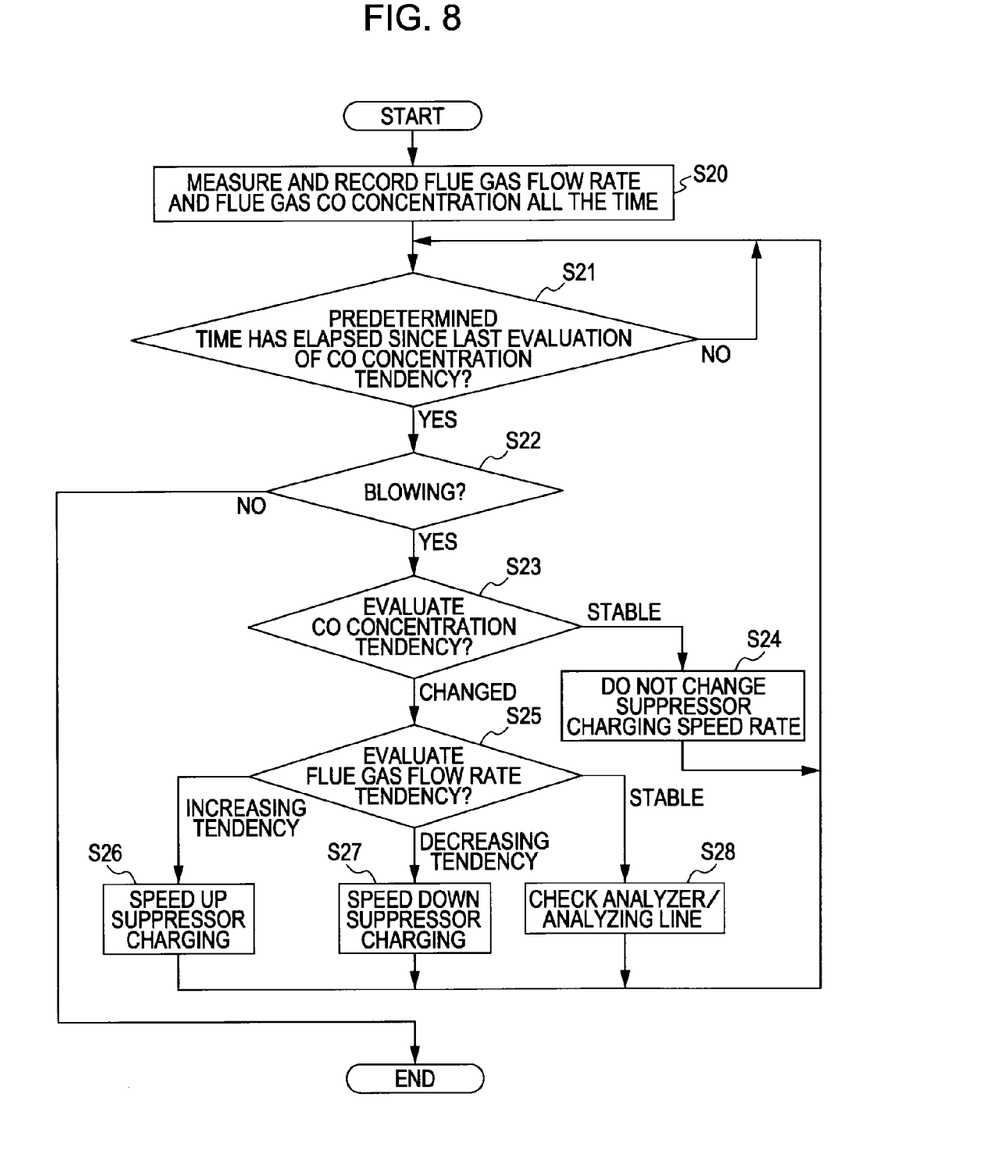
FIG. 8 is a flowchart for explaining a method of suppressing slag foaming according to a third embodiment of the present invention.

The method of suppressing slag foaming according to first to third embodiments will be specifically described along flowcharts shown in FIGS. 4, 6, and 8. In the following description, suppose that in-furnace pressure constant control is executed in the continuous melting furnace 1 (See FIG. 1), and an operation with a constant oxygen feeding amount is performed. Also, the above carbonaceous materials are applicable to the suppressor to be charged into the slag S in each embodiment, and aluminum, FeMn, SiMn, and FeNi, for example, are suitable as the suppressor in addition.

3-1. Method of Suppressing Slag Foaming According to First Embodiment (FIG. 4)

In the first embodiment, a charging speed rate of the suppressor is determined on the basis of a change in flue gas concentration. The method of suppressing slag foaming according to the first embodiment will be explained according to the flowchart shown in FIG. 4.

In this method, first, CO concentration of the flue gas is measured and recorded all the time (Step S1).

Then, it is determined if a predetermined time has elapsed since the last evaluation of CO concentration tendency (which will be described later) or not (Step S2). The above predetermined time is specifically 1 minute or preferably 30 seconds, or more preferably 15 seconds.

If a determination result at Step S2 is "No", processing of Step S2 is repeated. If the determination result at Step S2 is "Yes", whether or not it is during blowing is determined (Step S3). If it is not during blowing, there is no need to suppress slag foaming, and the processing is finished.

If it is determined as "Yes" at Step S3, the CO concentration tendency is evaluated (Step S4). In detail, a change amount of the CO concentration in a period of 2 minutes or preferably 1 minute, or more preferably 30 seconds is calculated in the evaluation of the CO concentration tendency, and on the basis of the result, it is determined if the tendency of the CO concentration is increasing, decreasing or stable. The change amount of the CO concentration can be calculated in a period shorter than 30 seconds, but in that case, an appropriate calculation cycle is preferably set, considering avoidance of an analysis cycle or hunting.

Figure 5:
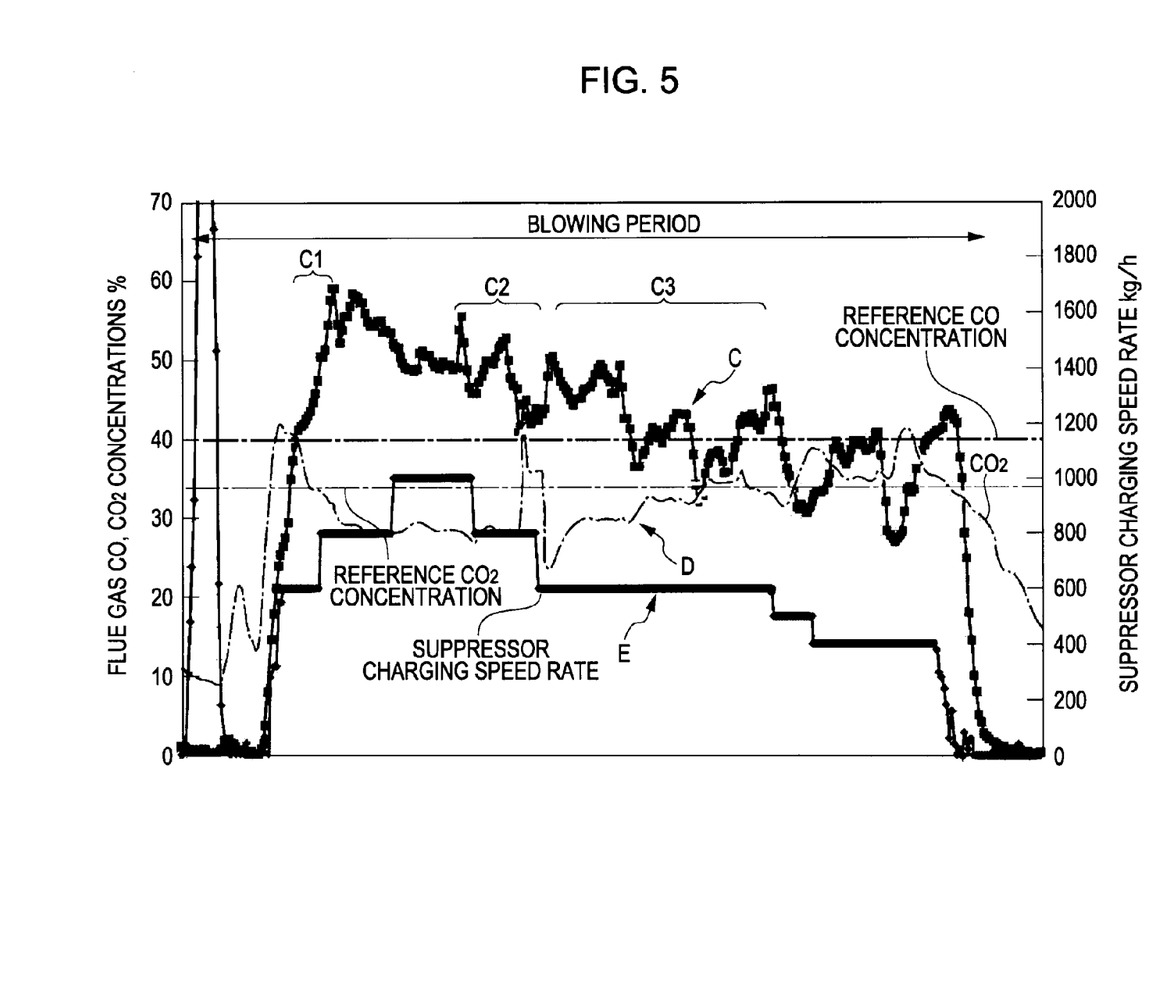
FIG. 5 is a graph illustrating changes of CO concentration and $CO_2$ concentration in a flue gas during a blowing period in the first embodiment.

FIG. 5 is a graph illustrating a change in the flue gas rate during the blowing period, in which the lateral axis indicates a blowing period, the longitudinal axis on the left side indicates CO concentration and $CO_2$ concentration in the flue gas, and the longitudinal axis on the right side indicates a suppressor charging speed rate. Also, in the graph, C indicates a change of CO concentration, D for a change of $CO_2$ concentration, and E for a change of the suppressor charging speed rate, respectively.

As shown by a zone C1 in the graph, if the CO concentration exceeds a reference CO concentration (40%) and increases to 60% and the CO concentration is evaluated on the increasing tendency, the suppressor charging speed rate (charging amount) is increased in a stepped manner by 30 to 35% of the reference charging speed rate (reference charging amount) (Step S5). This reference charging speed rate is determined in advance according to an oxygen feeding rate, and it is 600 kg/h in this embodiment. Therefore, in this embodiment, the suppressor charging speed rate is controlled to be sequentially increased from 600->800->1000 kg/h.

On the other hand, as shown by a zone C2 in the graph, if the CO concentration is decreased to 40% and the concentration is evaluated more on the decreasing tendency, the suppressor charging speed rate is decreased in a stepped manner sequentially from 1000->800->600 kg/h, for example. (Step S6).

Also, as shown by a zone C3 in the graph, if the CO concentration is up and down on the border of 40% and is not changed as a whole but stable, the suppressor charging speed rate is not changed but maintained constant (Step S4->S7).

Subsequently, the routine returns to Step S2 and stands by till the next evaluation of the CO concentration tendency.

If $O_2$ having been blown into the furnace is surely burning, CO is discharged as a flue gas, and slag foaming can be suppressed by measuring the CO concentration. However, if the blown $O_2$ does not reach the molten iron surface well and cannot be sufficiently offered for reaction, the $CO_2$ concentration is raised, and $O_2$ is further discharged.

As is known from the graph in FIG. 5, concentration distribution of $CO_2$ shows properties contrary to the CO concentration distribution. Therefore, if a large quantity of $CO_2$ is generated in the furnace, by measuring $CO_2$ concentration instead of measurement of CO concentration and by making evaluation on the basis of a tendency contrary to the tendency of the CO concentration, the slag foaming can be accurately suppressed. For example, if the $CO_2$ concentration has a decreasing tendency, control should be executed such that the suppressor charging speed rate is raised.

In an example shown in FIG. 5, the suppressor charging speed rate is set at a reference charging speed rate or less. This is because foaming made of a certain degree of bulk specific gravity needs to be formed in the slag, the formation of slag foaming is adjusted.

3-2. Method of Suppressing Slag Foaming According to Second Embodiment

In the second embodiment, the charging speed rate of the suppressor is determined on the basis of a change in the flue gas flow rate. The method of suppressing slag foaming according to the second embodiment will be described according to the flowchart shown in FIG. 6.

First, the flue gas flow rate is measured and recorded all the time (Step S10).

Then, it is determined if a predetermined time has elapsed since the last evaluation of flue gas flow rate tendency (which will be described later) or not (Step S11). The above predetermined time is specifically 1 minute or preferably 30 seconds, or more preferably 15 seconds.

If a determination result at Step S11 is "No", processing of Step S11 is repeated.

If the determination result is "Yes", then, whether or not it is during blowing or not is determined (Step S12). If it is not during blowing, there is no need to suppress slag foaming, and the processing is finished.

If it is determined as "Yes" at Step S12, it is determined if the measured flue gas flow rate has reached an initially stable flue gas flow rate or not (Step S13). The "initially stable" means that the flue gas flow rate has reached a flow rate that is balanced in calculation.

If the determination result at Step S13 is No, the processing at Step S13 is continued till the result that the flue gas flow rate has been stabilized can be obtained.

If the determination result at Step S13 is Yes, the flue gas flow rate tendency is evaluated (Step S14). With regard to this flue gas flow rate tendency, it is determined which of stable, increasing tendency, decreasing tendency, and rapid decreasing tendency is applicable.

Figure 7:
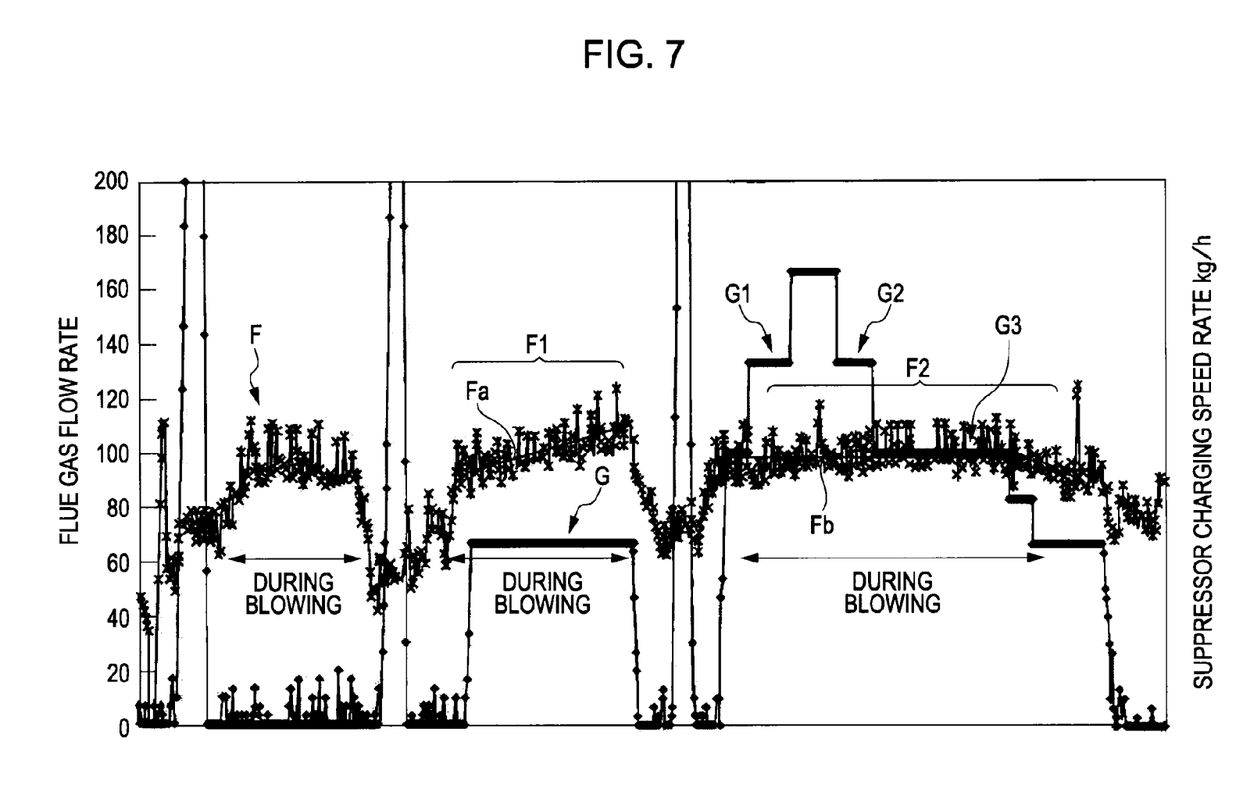
FIG. 7 is a graph illustrating a change of a flue gas flow rate during the blowing period in the second embodiment.

FIG. 7 is a graph illustrating a change in the flue gas flow rate during the blowing period, in which the lateral axis indicates a blowing time, the longitudinal axis on the left side for the flue gas flow rate, and the longitudinal axis on the right side for the suppressor charging speed rate. However, the flue gas flow rate is indicated with the reference flue gas flow rate as 100. Also, in the graph, F indicates a change in the flue gas flow rate and G for a change in the suppressor charging speed rate, respectively.

As shown by a line segment Fa in a zone f1 of the graph, if the flue gas flow rate has an increasing tendency, the suppressor charging speed rate is increased in a stepped manner as 800->1000 kg/h, for example (Step S15). Since there is a correlation between the blowing time and the flue gas flow rate, the line segment Fa can be acquired by calculating a regression line.

On the contrary, if the flue gas flow rate has a decreasing tendency, the suppressor charging speed rate is reduced (Step S16).

Also, if the flue gas flow rate has a rapid decreasing tendency, it is determined as abnormal slag foaming, and the suppressor charging speed rate is drastically increased (Step S17).

By means of stepped increase of the suppressor charging speed rate at Step S15 (See G1 in FIG. 5), the slag foaming is suppressed. When the flue gas flow rate is stabilized (See F2 in FIG. 5), the suppressor charging speed rate is maintained constant (See G3 in FIG. 5), and the routine returns to Step S11 and stands by till the next measurement of the flue gas flow rate.

As mentioned above, the charging speed rate of the suppressor can be determined on the basis of the change in the flue gas flow rate.

3-3. Method of Suppressing Slag Foaming According to Third Embodiment

In the above first and second embodiments, slag foaming is suppressed on the basis of the change in the flue gas concentration or the flue gas flow rate, but as shown in the flowchart in FIG. 8 according to the third embodiment, slag foaming can be suppressed on the basis of both the change in the flue gas concentration and the change in the flue gas flow rate.

In the same figure, first, the flue gas flow rate and the CO concentration of the flue gas are measured and recorded all the time (Step S20).

Then, it is determined if a predetermined time has elapsed since the last evaluation of the flue gas CO concentration (Step S21). The above predetermined time is specifically 1 minute or preferably 30 seconds, or more preferably 15 seconds.

If a determination result at Step S21 is "No," the processing at Step S21 is repeated.

If the determination result at Step S21 is "Yes," it is further determined whether or not it is during blowing is determined (Step S22). If it is not during blowing, there is no need to suppress slag foaming, and the processing is finished.

If it is determined as "Yes" at Step S22, the CO concentration tendency is evaluated (Step S23).

If the evaluation result is "stable," the suppressor charging speed rate is not changed (Step S24), and the routine returns to Step S21.

On the other hand, if the evaluation results are "changing" around the reference CO concentration as a border, the tendency of the flue gas flow rate is continuously evaluated (Step S25). With regard to the tendency of the flue gas flow rate, it is determined to which of stable, increasing tendency, decreasing tendency, and rapid decreasing tendency the tendency is applicable. If the flue gas flow rate has an increasing tendency, the suppressor charging speed rate is increased in a stepped manner (Step S26). On the contrary, if the flue gas flow rate has a decreasing tendency, the suppressor charging speed rate is reduced (Step S27). However, if the flue gas flow rate has a rapid decreasing tendency, it is determined as abnormal foaming, and the suppressor charging speed rate is drastically increased.

If the inside of the furnace is operated under a negative pressure, air leaking in the furnace is sucked from the outside all the time. If the slag foaming has risen to the furnace cover, the slag acts as a seal material and rapidly decreases a leaking air amount. Therefore, it can be determined that abnormal foaming has occurred from rapid decrease of the flue gas flow rate and rapid increase of the CO concentration.

On the other hand, if the inside of the furnace is operated under a positive pressure, it is possible to measure a gas component in a dust collector provided outside the furnace. In this case, too, similarly to the operation under the negative pressure, occurrence of abnormal foaming can be determined. Specifically, since no air leaks in the positive-pressure operation as in the negative-pressure operation and the flue gas is always emitted to the outside of the furnace, if the slag foaming rises to the furnace cover in this state, the slag acts as a sealing material and decreases an amount of emission to the outside of the furnace. Therefore, occurrence of abnormal foaming can be determined from drop in the CO concentration.

If it is evaluated that the flue gas flow rate is stable at Step S25, the flue gas content analyzer 8, the flue gas flow meter 9, and moreover, an analysis line are checked for abnormality (Step S28).

In the method of suppressing slag foaming on the basis of the changes in the flue gas concentration and the flue gas flow rate according to this third embodiment, if there is a change in the CO concentration tendency and there is also a change in the flue gas flow rate tendency, control to increase/decrease the suppressor charging speed rate is executed. Therefore, slag foaming can be suppressed more accurately than the control only on the basis of the flue gas concentration or flue gas flow rate.

As mentioned above, according to the method of suppressing slag foaming in the continuous melting furnace of the present invention, it becomes possible to accurately suppress slag foaming by determining the suppressor charging speed rate for suppressing slag foaming on the basis of the change in the flue gas flow rate from the continuous melting furnace, the change in the CO concentration in the flue gas or the changes of both the flue gas flow rate and the CO concentration in the flue gas, by which molten metal can be continuously produced in a stable state.

Here, the reference CO concentration can be set on the basis of the oxygen feeding amount and the furnace pressure.

Also, the suppressor charging speed rate can be adjusted by using a carbonaceous material as the suppressor and by increasing or decreasing the charging amount by 30 to 35% of the reference charging amount in a stepped manner.

The invention claimed is:

1. A method of suppressing slag foaming generated in a continuous melting furnace continuously producing molten metal such as molten iron by melting solid reduced metal, comprising steps of:
   charging a suppressor suppressing the slag foaming into slag generated in the continuous melting furnace;
   measuring a flow rate of a flue gas discharged from the continuous melting furnace over time during blowing of the slag; and
   increasing a charging speed rate of the suppressor if the measured flue gas flow rate has an increasing tendency and decreasing the charging speed rate of the suppressor if the flue gas flow rate has a decreasing tendency.

2. The method of suppressing slag foaming generated in a continuous melting furnace according to claim 1, wherein the flue gas comprises $N_2$, CO, $CO_2$, and $O_2$.

3. A method of suppressing slag foaming generated in a continuous melting furnace continuously producing molten metal such as molten iron by melting solid reduced metal, comprising steps of:
   charging a suppressor suppressing the slag foaming into slag generated in the continuous melting furnace;
   measuring CO concentration of a flue gas discharged from the continuous melting furnace over time during blowing of the slag; and
   increasing a charging speed rate of the suppressor if the measured CO concentration exceeds a reference CO concentration set in advance and has an increasing tendency and decreasing the charging speed rate of the suppressor if the CO concentration has a decreasing tendency;
   wherein a carbonaceous material is used as the suppressor, and the suppressor charging speed rate is adjusted by increasing or decreasing the charging amount by 30 to 35% of a reference charging amount in a stepped manner.

4. The method of suppressing slag foaming generated in a continuous melting furnace according to claim 3, wherein the flue gas comprises $N_2$, CO, $CO_2$, and $O_2$.

5. A method of suppressing slag foaming generated in a continuous melting furnace continuously producing molten metal such as molten iron by melting solid reduced metal, comprising steps of:
   charging a suppressor suppressing the slag foaming into slag generated in the continuous melting furnace;
   measuring a flow rate and CO concentration of a flue gas discharged from the continuous melting furnace over time during blowing of the slag;
   examining a tendency of the flue gas flow rate if the measured CO concentration is changed from a reference CO concentration set in advance as a border; and
   increasing a charging speed rate of the suppressor if the flue gas flow rate has an increasing tendency and decreasing the charging speed rate of the suppressor if the flue gas flow rate has a decreasing tendency.

6. The method of suppressing slag foaming generated in a continuous melting furnace according to claim 5, wherein the flue gas comprises $N_2$, CO, $CO_2$, and $O_2$.

7. The method of suppressing slag foaming generated in a continuous melting furnace according to claim 1 or 5, wherein
   a carbonaceous material is used as the suppressor, and the suppressor charging speed rate is adjusted by increasing or decreasing the charging amount by 30 to 35% of a reference charging amount in a stepped manner.

8. The method of suppressing slag foaming generated in a continuous melting furnace according to claim 7, wherein the suppressor additionally comprises a material selected from the group consisting of aluminum, FeMn, FeNi, and SiMn.

9. The method of suppressing slag foaming generated in a continuous melting furnace according to any one of claims 1 to 5, wherein the molten metal produced is iron.

10. The method of suppressing slag foaming generated in a continuous melting furnace according to claim 3 or 5, wherein
   the reference CO concentration is set on the basis of an oxygen feeding amount and a furnace pressure.

* * * * *